US009273694B2

(12) United States Patent
Brady et al.

(10) Patent No.: US 9,273,694 B2
(45) Date of Patent: Mar. 1, 2016

(54) REACTOR COOLANT PUMP MOTOR LOAD-BEARING ASSEMBLY CONFIGURATION

(75) Inventors: David R. Brady, Export, PA (US); Thomas G. Loebig, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1887 days.

(21) Appl. No.: 12/493,267

(22) Filed: Jun. 29, 2009

(65) Prior Publication Data

US 2010/0329890 A1 Dec. 30, 2010

(51) Int. Cl.
| | | |
|---|---|---|
| *F04B 17/00* | (2006.01) | |
| *F04D 29/047* | (2006.01) | |
| *F04D 29/06* | (2006.01) | |
| *F04D 29/58* | (2006.01) | |
| *F16N 7/36* | (2006.01) | |
| *F16N 39/02* | (2006.01) | |

(52) U.S. Cl.
CPC ............ *F04D 29/047* (2013.01); *F04D 29/061* (2013.01); *F04D 29/588* (2013.01); *F16N 7/366* (2013.01); *F16N 39/02* (2013.01)

(58) Field of Classification Search
CPC ... F04D 29/047; F04D 29/588; F04D 29/061; F16N 7/366; F16N 39/02
USPC ........... 29/888.02, 888.021–888.024; 417/53; 376/260, 263
See application file for complete search history.

(56) References Cited

U.S. PATENT DOCUMENTS

| | | | | |
|---|---|---|---|---|
| 4,269,566 | A | * | 5/1981 | Spruiell ..................... 415/112 |
| 4,564,500 | A | * | 1/1986 | Keady ......................... 376/463 |
| 5,061,432 | A | * | 10/1991 | Matusz ........................ 376/260 |
| 5,307,386 | A | * | 4/1994 | Chavez et al. .............. 376/260 |
| 5,604,777 | A | * | 2/1997 | Raymond et al. ........... 376/310 |
| 7,668,281 | B2 | * | 2/2010 | Balog et al. ................ 376/260 |
| 2010/0329411 | A1 | * | 12/2010 | Brady et al. ................ 376/340 |

FOREIGN PATENT DOCUMENTS

| | | |
|---|---|---|
| JP | 57040197 | 3/1982 |
| JP | 11230493 | 8/1999 |

OTHER PUBLICATIONS

Westinghouse Electric Company LLC, International Search Report, EP 10006663, Jul. 7, 2015, 8 pgs.

* cited by examiner

*Primary Examiner* — Ryan J Walters
(74) *Attorney, Agent, or Firm* — Richard J. Coldren; Westinghouse Electric Company LLC

(57) ABSTRACT

A method of upgrading a 1,500 rpm reactor coolant pump motor having a vertically oriented rotor shaft supported by a lower guide bearing disposed in an oil reservoir. The method includes removing a lower guide bearing support to enhance circulation of the oil to facilitate cooling of the oil and operating the reactor coolant pump motor at 1,500 rpm without the lower guide bearing support or the oil baffle or flinger ring attached to the lower guide bearing support. The method further includes thickening a keeper to support the guide bearing.

6 Claims, 7 Drawing Sheets

REACTOR COOLANT PUMP MOTOR LOAD-BEARING ASSEMBLY CONFIGURATION

BACKGROUND OF THE INVENTION

1. Field of the Invention

This present invention relates in general to nuclear reactor main coolant pumps and in particular to such coolant pumps that have vertically oriented shafts with lower guide bearings. More particularly, the invention relates to such main reactor coolant pumps that operate at 1,500 rpm.

2. Description of Related Art

The reactor main coolant pump motors drive the reactor main coolant pumps which are part of the primary reactor coolant system in a pressurized water reactor nuclear power plant. The motors are typically arranged with vertical shafts. The bearing and lubrication system of a vertical motor is usually contained in two separate oil pots (also referred to as oil reservoirs). An upper oil pot contains the upper guide or radial bearings and the total thrust bearing system. The lower oil pot contains the lower guide or radial bearings. Each of these oil pots is typically provided with cooling coils for carrying cooling water to dissipate the heat which is generated by the bearing systems.

The design of the oil pots is such that the oil level within the pot should be monitored during operation to ensure that the oil level is not rising above or falling below the expected levels. A rising level might indicate, for example, a water leak within the cooling coils which results in water entering the pot and mixing with the oil. If such a situation were to persist, the lubricating ability of the oil would be sharply diminished and, more importantly, the oil/water mixture would overflow the pot and migrate toward the hot reactor coolant pump, where a fire could result.

Reactor coolant pump motors that normally operate at 1,500 rpm, are installed at many facilities outside the United States wherever grid electrical power is supplied at 50 Hz. In comparison, the corresponding reactor main coolant pumps installed in the United States where the grid electrical power is supplied at 60 Hz, operate at 1,200 rpm. One type of 1,500 rpm vertically oriented reactor coolant pump motor has a baffle and support arrangement between the lower guide bearings and the lower portion of the oil pot that contains the cooling coils, to reduce turbulence of the oil that was an anticipated result from the increased speed of the coolant pumps and to avoid oil splashing over the edges of the pot and possibly migrate toward the hot reactor coolant pump where a fire could result. The lower guide bearings in these 1,500 rpm motors historically have exhibited higher than expected operating temperatures at the bearing pads. The overheating cannot be explained by the difference in speed alone. While these higher temperatures have not been known to affect operability, they typically are greater than the specified normal operating temperature of 160° F. (71.21° C.) and may run close to the normal alarm point of 190° F. (87.8° C.) when their oil cooler component cooling water approaches the maximum normal operating temperature of 105° F. (40.6° C.). These temperatures are typically achieved with component cooling water flow rates of 6 GPM nominal. The high operating temperatures may have adverse consequences for long-term bearing, shaft and oil performance, particularly with sustained component cooling water temperatures at or near maximum. Based on the principles of fluid mechanics and heat transfer and experience with over 150 60Hz reactor coolant pump motors, the inventors have concluded that these high lower guide bearing temperatures are due to the lack of oil flow within the reservoir caused by three components that do not exist in the 1,200 rpm motors. These three components isolate the portion of the oil reservoir that contains the bearings from the portion that contains the oil cooler, except for some relatively small passages in and between these components and the remaining parts of the lower guide bearing assembly.

Accordingly, it is an object of this invention to improve the oil circulation within the lower guide bearing oil pots to reduce the operating temperatures of the lower guide bearings.

It is a further object of this invention to improve the circulation of the oil within the lower guide bearing oil pot without increasing the turbulence of the oil to the point where the oil splashes over the edges of the pot.

It is an additional object of this invention to achieve the foregoing objectives without reducing the support for the bearing.

SUMMARY OF THE INVENTION

These and other objects are achieved by the method of this invention for upgrading a 1,500 rpm reactor coolant pump motor having a vertically oriented rotor shaft supported by a lower guide bearing disposed in an oil reservoir; the rotor having a horizontally extending lower guide bearing support just below the lower guide bearing and spaced from the bottom of the oil reservoir. In the preferred embodiment, the method of this invention includes removing the lower guide bearing support to enhance circulation of the oil to facilitate cooling of the oil and operating the reactor coolant pump motor substantially at 1,500 rpm without the lower guide bearing support. In one preferred embodiment, the oil reservoir includes cooling coils spaced outwardly of and below the lower guide bearing, including a baffle between the lower guide bearing and the cooling coils with the method of this invention further including the step of removing the baffle as part of the upgrade. Additionally, in another preferred embodiment wherein the oil reservoir includes a flinger ring suspended below the guide bearing support and extending outwardly from the guide bearing support toward the rotor shaft, the method further includes the step of removing the flinger ring as part of the upgrade. In still another preferred embodiment of this invention wherein the reservoir includes an original keeper supported by an outer wall of the reservoir and extending radially inward and connecting with the lower portion of the guide bearing to support the lower portion of the guide bearing, the method further includes the step of replacing the keeper with a thicker keeper. Preferably, in the latter case, the thicker keeper has the same general geometry as the original keeper except for increased thickness.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figures 1, 3:
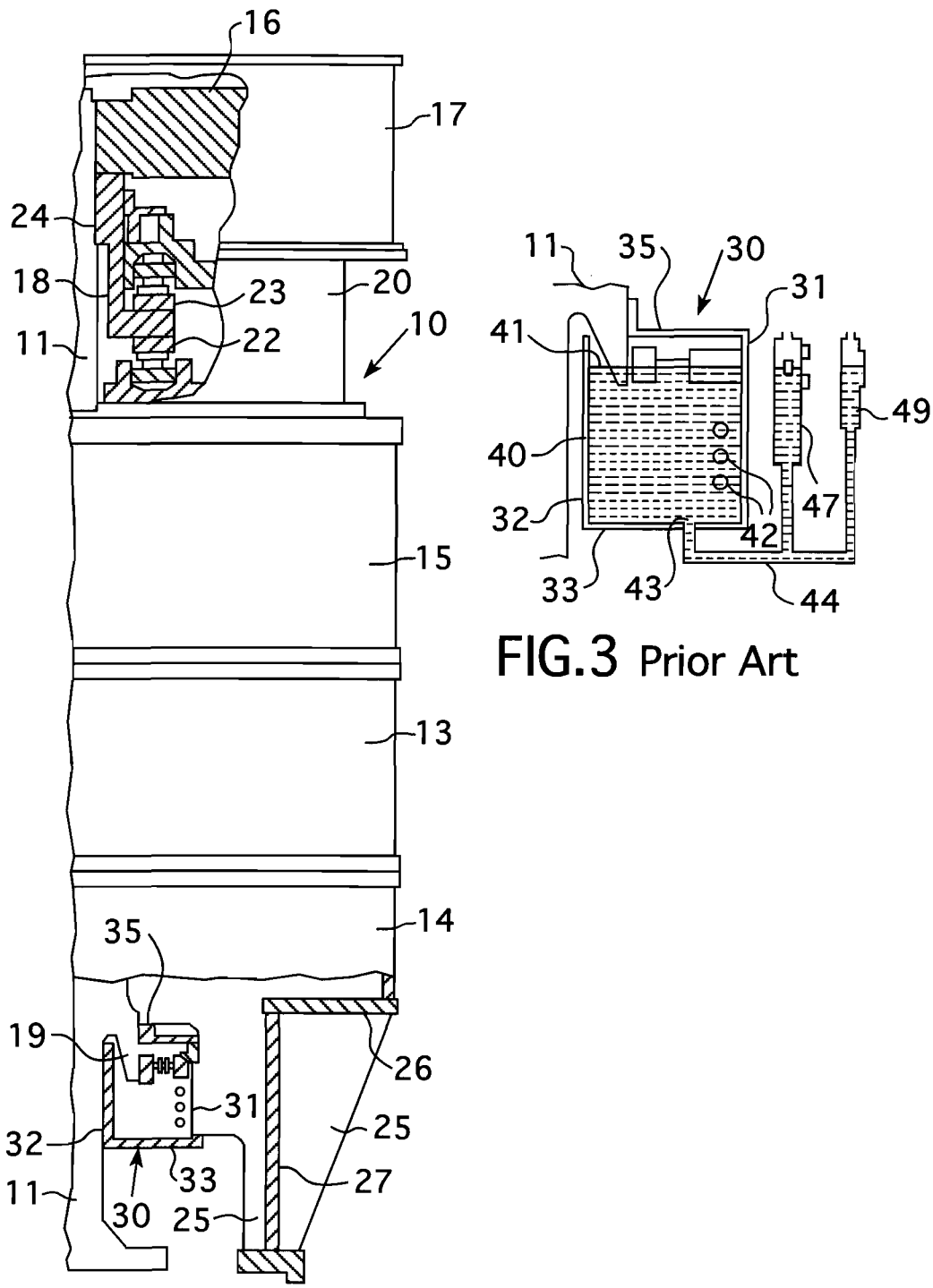
FIG. 1 is a fragmentary, elevational view, partially in section, of the reactor coolant pump motor showing the bearing sections.
FIG. 3 is a diagrammatic view of a lower oil reservoir of a prior art reactor coolant pump motor with the oil therein at normal level.

Referring to FIG. 1 of the drawings, there is illustrated a reactor coolant pump motor, generally designated by the numeral 10, which is of conventional construction. The motor 10 includes a vertical shaft 11 on which is mounted a rotor core assembly (not shown) surrounded by a stator core assembly 13 which is supported between lower and upper brackets 14 and 15. The upper end of the shaft 11 carries a flywheel 16 mounted within a flywheel cover 17. The shaft 11 is provided with upper and lower annular runners 18 and 19.

The upper runner 18 extends into an annular upper oil pot 20 and circles the shaft 11 and is disposed for engagement with an up-thrust bearing 22, and down-thrust bearing 23 and an upper guide bearing 24, all disposed within the upper oil pot 20. The lower runner 19 extends downwardly into an annular lower oil pot 30 which encircles the shaft 11 and is supported on a plurality of equiangularly spaced-apart lower support webs 25, the webs 25 being interconnected by an annular support plate 26 and by cylindrical connecting webs 27.

Figure 2:
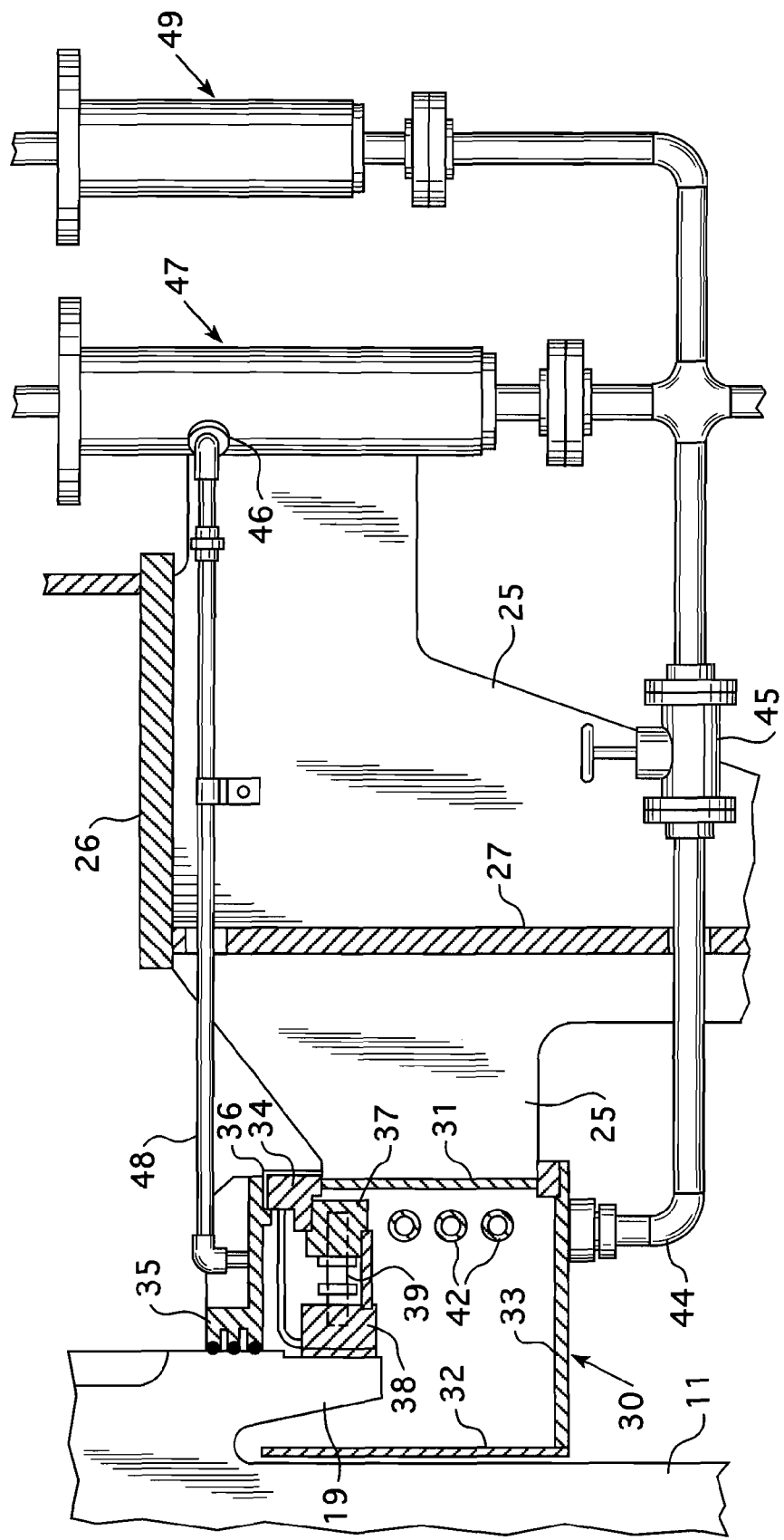
FIG. 2 is an enlarged fragmentary view in vertical section of the lower portion of the pump motor of FIG. 1 showing an enlarged view of the lower bearing oil pot and oil level indicating system of the prior art.

Referring to FIGS. 1 and 3 of the drawings, the lower oil pot 30 includes a cylindrical outer wall 31 and a cylindrical inner wall 32, the walls 31 and 32 being interconnected by an annular bottom wall 33. Fixedly secured to the outer wall 31 at the upper edge thereof is a circular head rail 34 which supports thereon an annular seal 35, a gasket 36 being provided therebetween. The seal 35 is disposed in sealing engagement with the runner 19 of the shaft 11. Carried by the head rail 34 within the oil pot 30 is a support ring 37 (FIG. 2). A plurality of bearing shoes 38 are disposed for bearing engagement with the outer surface of the runner 19 at equiangularly spaced-apart points therearound, the bearing shoes 38 being respectively held in engagement with the runner 19 by a plurality of adjusting screws 39 carried by the support ring 37.

All of the structure described above is of a conventional construction and is provided in prior art reactor coolant pump motors. The lower oil pot from such a prior art motor is disclosed in a front elevational view partially in section in FIG. 2 and diagrammatically in FIG. 3. The oil pot 30 contains a volume of oil 40 which, at ambient temperatures, normally fills the oil pot 30 to a level 41 illustrated in FIG. 3. A plurality of cooling coils 42 carry cooling water through the oil pot 30 for cooling the oil 40 therein. The oil pot 30 is also referred herein as the lower oil reservoir. The oil pot 30 communicates at a port 43 in the bottom wall 33 with a conduit 44 which connects with a valve 45 to one or more oil level gauges, which may include a float gauge 47 and a sight gauge 49. Both of the gauges 47 and 49 are in liquid communication with the conduit 44 so that the oil rises therein to the same level 41 as is present in an oil pot 30. The float gauge 47 carries a floating element which is disposed for magnetically operating high and low sensor switches to indicate at normally high and low levels of oil 40 in the oil pot 30. The sight gauge 49 typically includes a transparent window portion so that the level of oil 40 therein can be visibly observed.

The high level indication is to indicate excess fluid in the oil pot 30 which might be occasioned by a water leak within the cooling coils 42, resulting in water entering the oil pot 30 and mixing with the oil 40. Such a high level would typically trigger an alarm signal, since the dilution of the oil 40 would lessen its lubricating ability and, more importantly, as the leak continued the oil/water mixture might overflow the oil pot 30 and contact the hot reactor coolant pump causing a fire. The low level sensor is for the purpose of indicating a falling oil level in the oil pot 30, which might be indicative of an oil leak. Such a low level would trigger an alarm signal since a continued leak would cause the oil level to drop to the point where the oil no longer lubricates the bearing shoes 38, resulting in severe damage to the bearing shoes, and possibly to the motor shaft 11 and/or runner 19. Furthermore, this condition could also result in a fire if the leaking oil were to contact the hot pumps surfaces.

In this prior art arrangement, the oil 40 in the oil pot 30 tends to expand when heated. Despite the cooling effect of the cooling coils 42, the oil 40 may be heated to such an extent that it expands to a level such that it will actuate the high level sensor in the float gauge 47 setting off a high level alarm. Such an alarm is spurious since it is not occasioned by excess fluid in the oil pot 30.

If one accepts that the lower guide bearing reservoir 30 when filled to the normal static level has the proper inventory of oil in which to operate, and any change to the observed level within the alarm assembly following motor start-up is due to factors acting on this proper inventory, then one can also accept that the dynamic oil level will reach an equilibrium that also represents the proper inventory of oil.

The factors that influence the observed dynamic, or running, oil level are primarily hydraulic and thermal. These factors have a direct and predictable outcome in the change of observed levels between static and dynamic conditions. As the motor accelerates to speed, the velocity of the oil within the lower bearing oil reservoir 30 increases as does turbulence within the reservoir. In addition, temperature changes from the production of heat due to the rubbing velocity of the bearing 38 and the journal (shaft) 11, as well as increases in containment temperature may affect the overall volume but not the inventory of oil. Temperature changes cause changes in density and viscosity of the oil, resulting in thermal volumetric expansion and changes in oil flow velocities. Additionally, some amount of oil aeration is expected to occur due to the turbulence and splashing of the oil, causing further volumetric expansion of the oil in the system. When thermal and hydraulic conditions stabilize, the dynamic oil level stabilizes and becomes a new base line reference oil level that is the proper dynamic indication of oil inventory.

Depending on the lower bearing assembly and oil level indicating system designs, the base line reference level may, in fact, match the static level, but this ideal performance is not always achieved, as the dynamic level often deviates from the static level. This deviation usually is unimportant. What is important is that the level obtained with the motor energized at normal operating temperature and pressure remains stable within a tolerance band once thermal and hydraulic equilibrium is achieved. Fluctuations due to normal variations in ambient and cooling water temperature are expected and acceptable. The base line reference level can also vary between different motors depending on the particular designs of the lower guide bearing, the oil reservoir, and the level indicating system, and also due to variations in operating conditions, particularly thermal variations. This too is acceptable and expected. Variations in oil level and other motor parameters also have been observed to occur when one motor is moved to another motor compartment in the same power plant. The difficulty with the current oil level system in the 1,500 rpm reactor coolant pump motors in Westinghouse nuclear power plants is that the oil level alarm switch assembly on this motor does not have sufficient adjustment range to place the high alarm above the base line reference level to prevent alarm actuation. Thus, the base line reference level exceeds the high alarm level causing an alarm condition with the plant at power, which is not acceptable. The lower guide bearing assemblies in Westinghouse reactor coolant pump motors that operate at 1,500 rpm at an electrical supply of 50 Hz have been observed to have higher than expected operating temperatures at the bearing pads which contribute to this high alarm condition and could have adverse consequences to long term performance when faced with sustained maximum temperatures.

Figure 4:
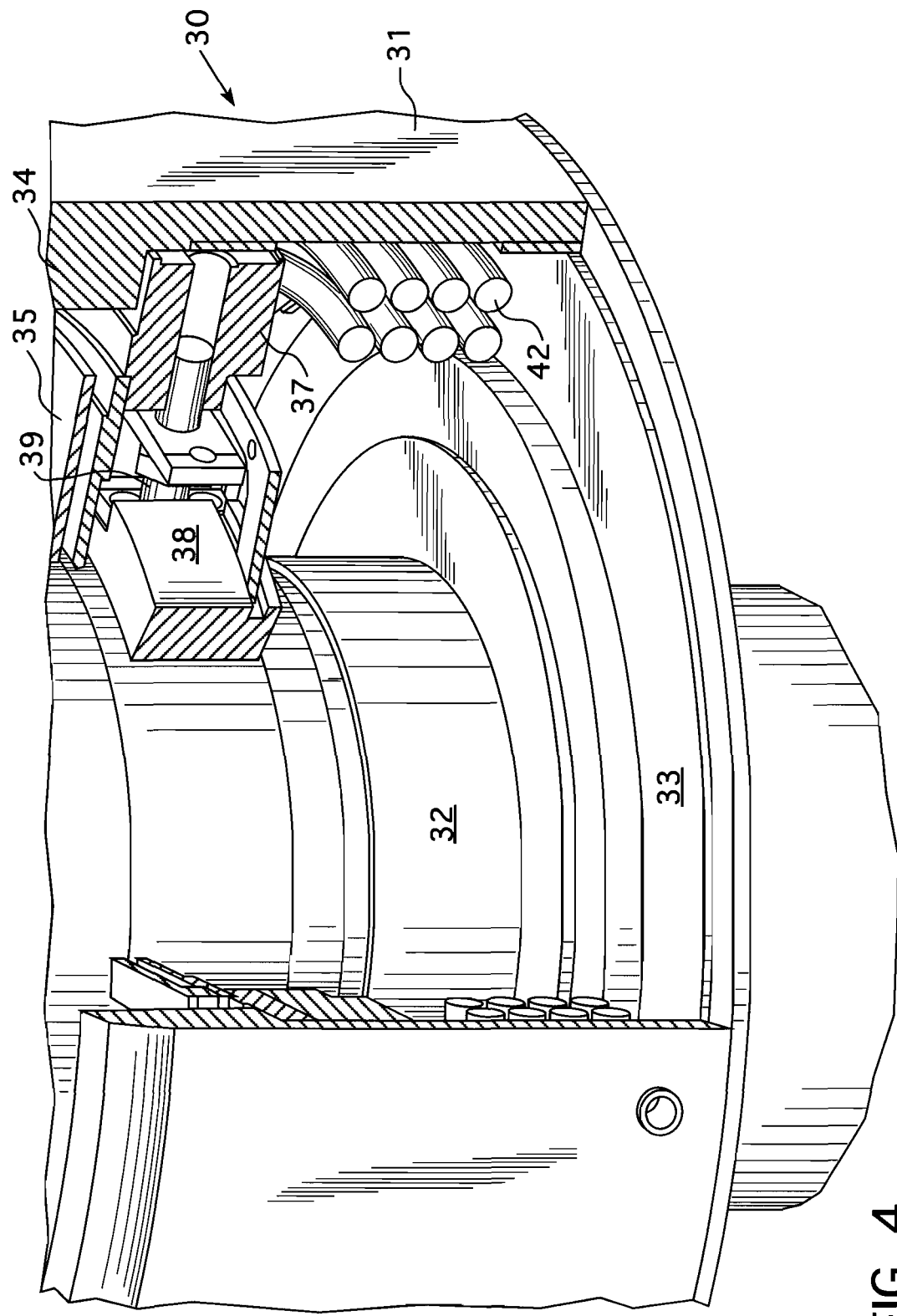
FIG. 4 is a perspective view of the lower guide bearing oil reservoir showing the guide bearing modification of this invention.
Figure 5:
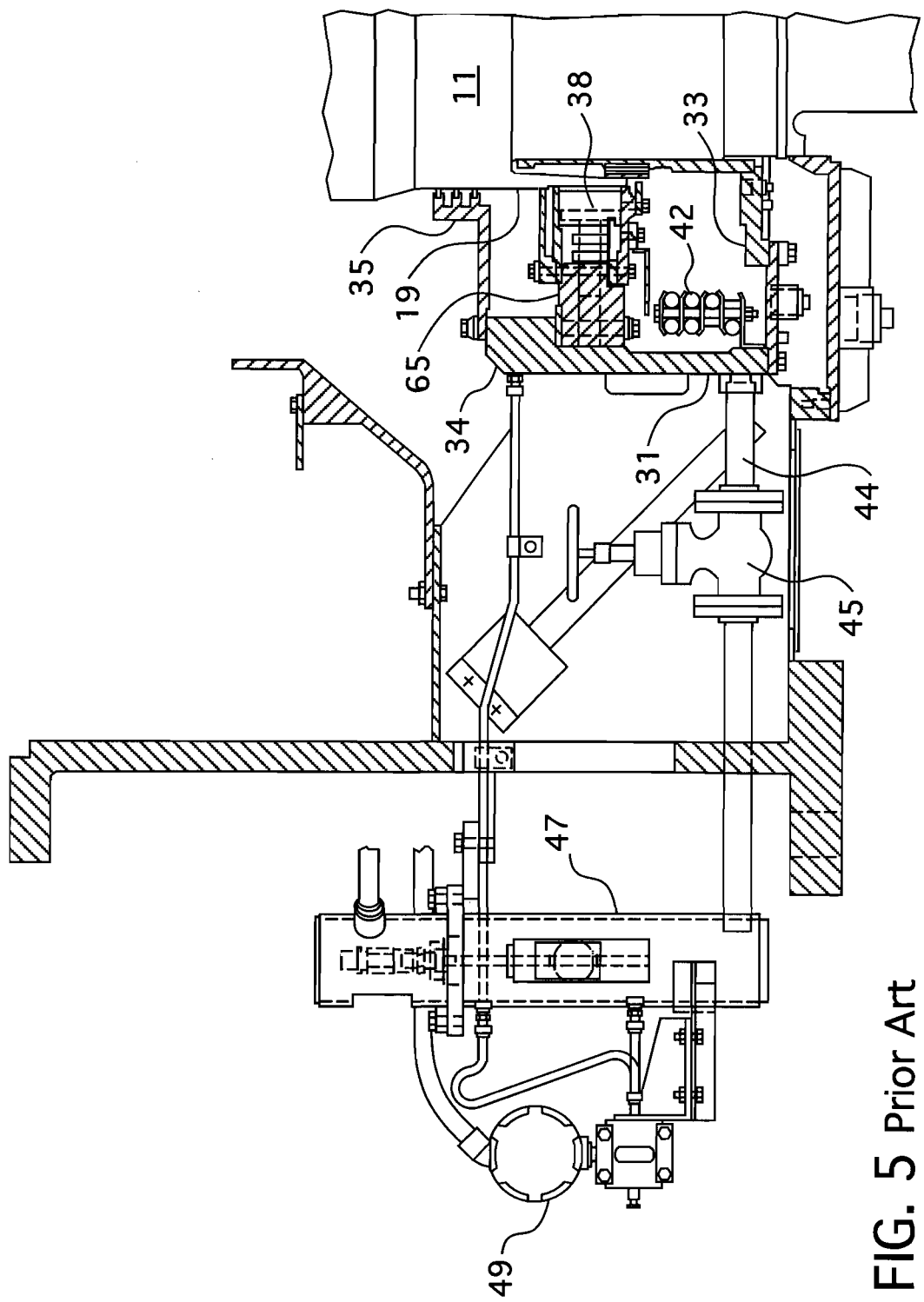
FIG. 5 is an elevational view, partially in section, of the prior art lower guide bearing arrangement.
Figure 6:
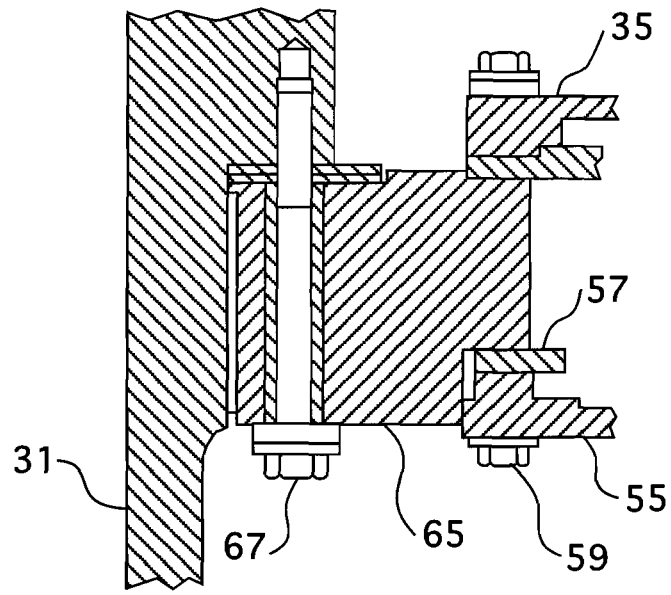
FIG. 6 is an enlarged portion of the outer wall of the oil reservoir shown in FIG. 5 showing the prior art coupling of the bearing support.
Figure 7:
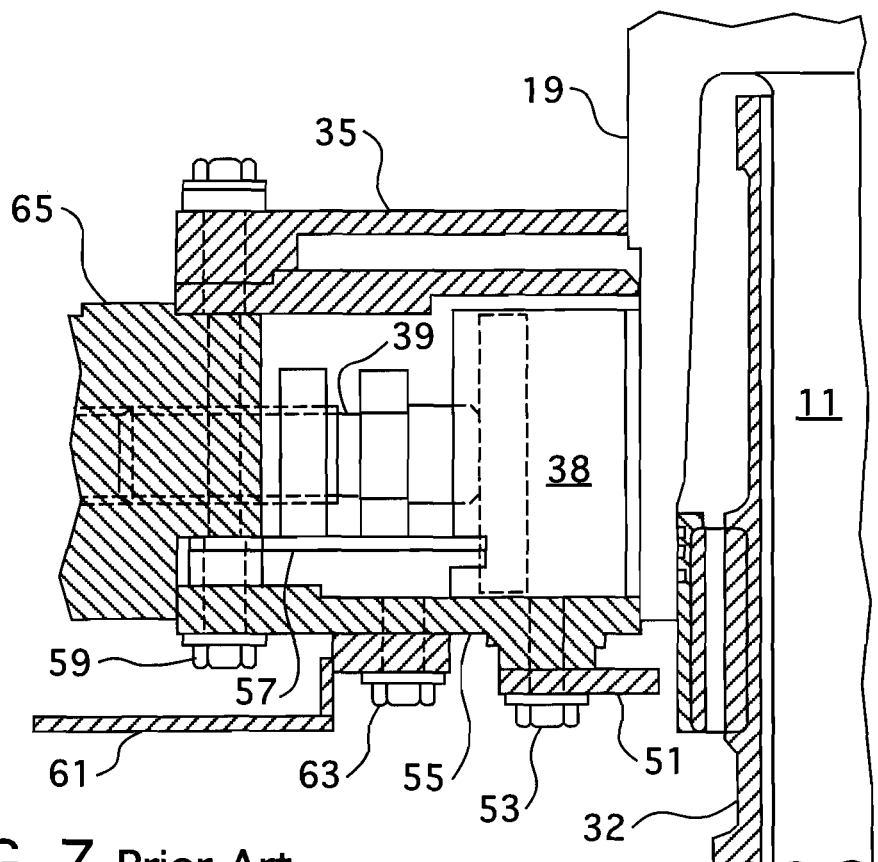
FIG. 7 is an enlarged portion of FIG. 5 showing the prior art bearing support.

As illustrated in FIG. 4, the method of this invention provides a new bearing support arrangement that promotes circulation of the oil 40 within the oil reservoir 30 which results in lower oil operating temperatures. The improvement offered by this invention can be better appreciated from an understanding of the prior art bearing support arrangement which is shown in FIGS. 5, 6, and 7. FIG. 5 shows the overall arrangement of the lower oil pan and associated level gauges with the bearing 38 supported from the outer wall 31 of the oil pan. Like reference characters have been employed to identify corresponding components among the various figures. FIGS. 6 and 7 show enlarged views of the bearing support arrangement shown in FIG. 5 with FIG. 6 showing the left-hand portion in which the bearing support block 65 is bolted to the outer wall 31 of the oil reservoir 30 with hex bolt 67. For convenience, the bearing adjusting screws 39 have been omitted from FIG. 6. The bearing support block 65, in turn, supports an upper annular seal 35, a bearing keeper 57, and a bearing support plate 55 which are bolted to the bearing support block 65 with hex bolt 59. FIG. 7 shows the right-hand portion of the bearing support arrangement with an overlap around the bearing support plate bolt 59 and the bolt that attaches the upper seal 35 to the bearing support block 65. The bearing support plate 55 extends between the bearing support block 65 and the lower runner 19 and supports an oil baffle 61 which is attached to the bearing support plate with hex bolt 63 and extends over the cooling coils 42 shown in FIG. 5, but not shown in FIG. 7. The bearing support plate 55 also supports a flinger ring 51 with attachment bolt 53 connecting the flinger ring 51 to the bearing support plate 55. The oil baffle 61 and the flinger ring 51 were introduced in the 1,500 rpm reactor coolant motor to reduce added turbulence that was expected from the higher speed of the shaft 11 of the 1,500 rpm reactor coolant motor over that experienced in the 1,200 rpm reactor coolant pump motors used for 60 cycle operation.

Figure 8:
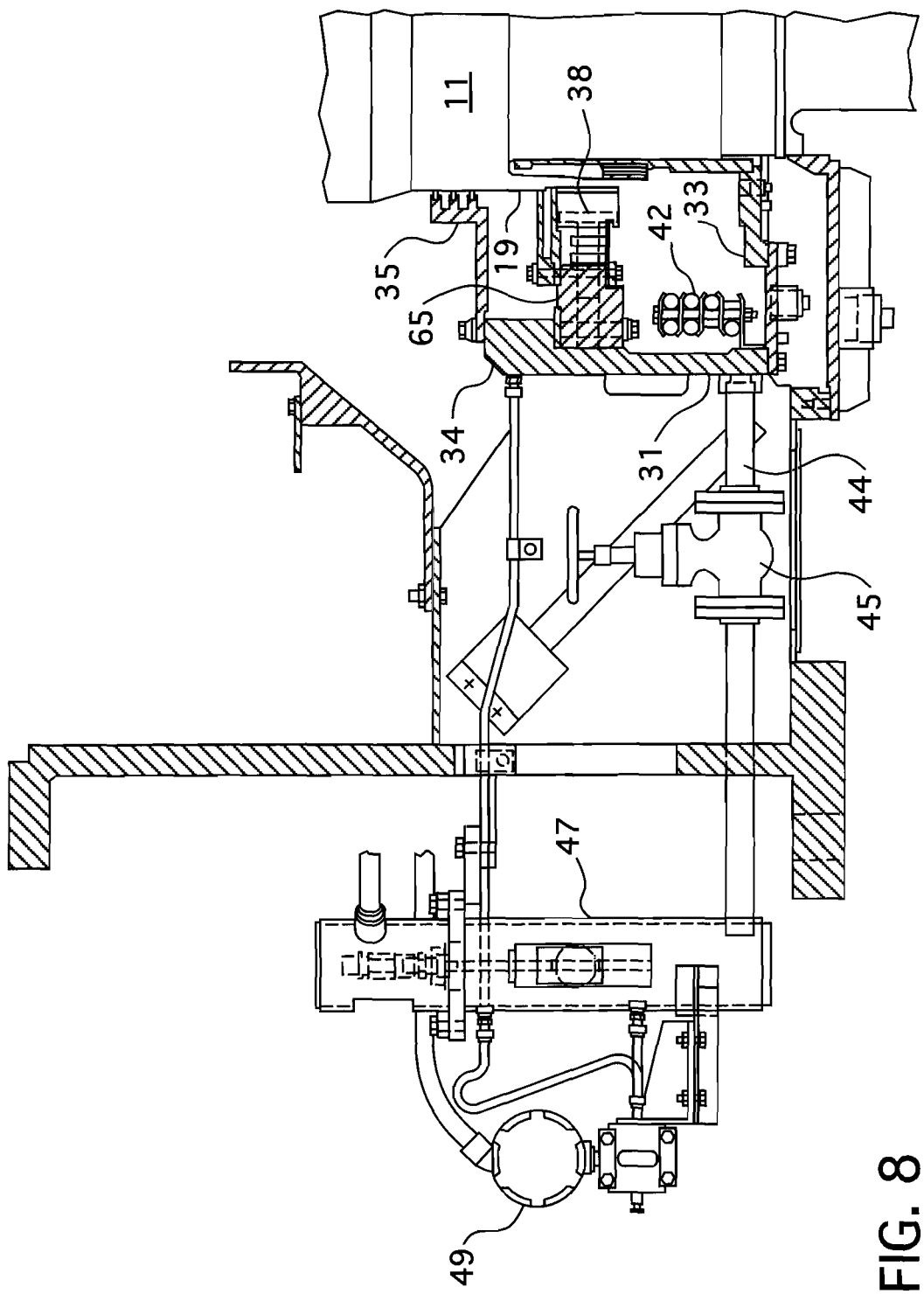
FIG. 8 is the elevational view shown in FIG. 5 with the modification of this invention.
Figure 9:
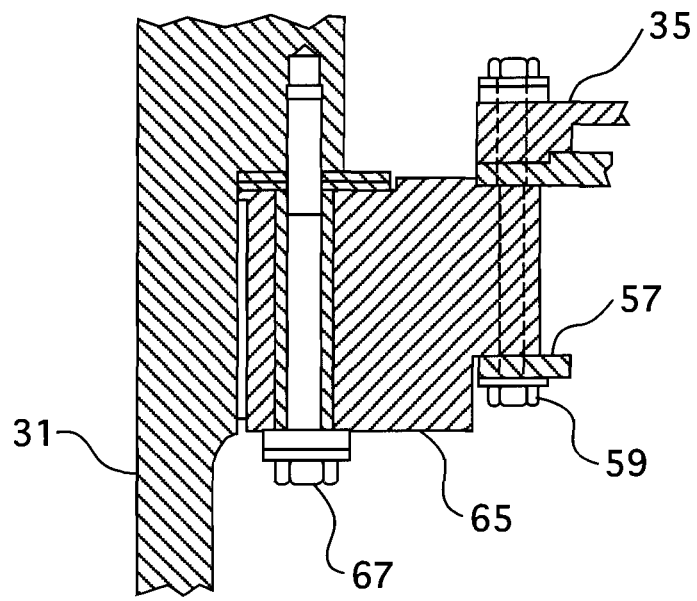
FIG. 9 is an enlarged portion of the coupling between the oil reservoir wall and bearing support shown in FIG. 8.
Figure 10:
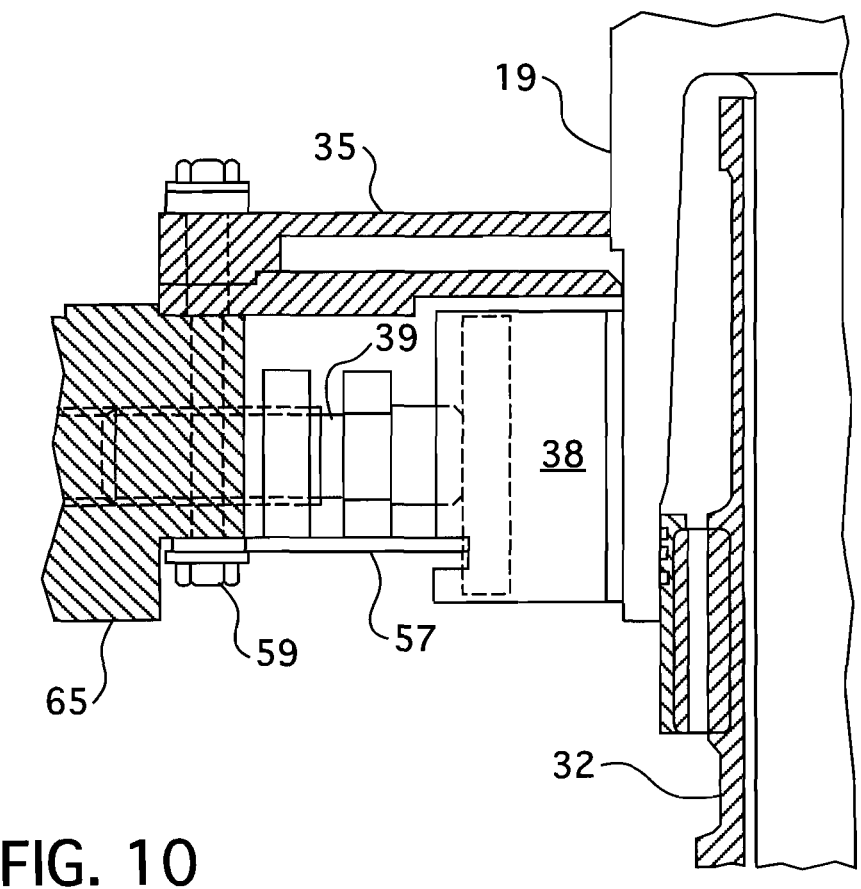
FIG. 10 is an enlarged portion of the bearing support shown in FIG. 8.

This invention recognized that the lower guide bearing support 55 could be removed to enhance circulation and cooling of the oil without endangering support for the bearing shoes 38 and without the oil splashing over the sides of the lower oil reservoir 30. FIG. 8 shows the view illustrated in FIG. 5 with the lower bearing support plate removed and FIGS. 9 and 10 are corresponding views to that of FIGS. 6 and 7 showing the results of this invention in more detail. Comparing FIGS. 9 and 6, it can readily be seen that the attachment of the bearing support block 65 to the reservoir outer wall 31 with the attachment bolt 67 is the same. The change occurs at the other end of the bearing support block 65 where the bearing support plate 55 has been completely removed and the keeper 57 is thickened slightly to approximately one-eighth inch (0.32 centimeters). Thus, in accordance with this invention, the flinger ring 51, the corresponding bolt and washer 53, the oil baffle 61 and the oil baffle attachment bolt and washer 63, along with the lower guide bearing support plate 55, are completely removed and the keeper 57 is attached through a bolt 59 directly to the bearing support block 65.

This invention recognized that considerable stratification of both flow and temperature existed between the top and bottom portions of the reservoir 30 in the original design, as divided by the baffle 61, flinger ring 51, and lower bearing support plate 55. By removing the flinger ring 51, oil baffle 61 and lower guide bearing support plate 55, not only is the resistance to radial and tangential flow removed, but an additional portion of the journal 11 is exposed which significantly increases radial flow of the oil. The improved fluid flow resulting from this modification also enhances bearing cooling by improving heat transfer to the ambient air. Testing has shown that significant heat is transferred to the motor frame and then to the air flowing through and over the motor. Testing also showed that the potential adverse oil hydraulic consequences that were of concern when eliminating these components, are negligible. No oil spill over the stand pipe 32 was detected and no oil splash or misting caused oil to leak through the upper seals. Oil aeration was not observed to occur throughout testing and the change in oil level was not significant.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of upgrading a 1500 rpm reactor coolant pump motor having a vertically oriented rotor shaft supported by a lower guide bearing disposed in an oil reservoir, the rotor having a horizontally extending lower guide bearing support just below the lower guide bearing and spaced from a bottom of the oil reservoir, comprising the steps of:
   removing the lower guide bearing support to enhance circulation of the oil to facilitate cooling of the oil; and
   operating the reactor coolant pump motor at 1500 rpm without the lower guide bearing support.

2. The method of claim 1 wherein the oil reservoir includes cooling coils spaced outwardly of and below the lower guide bearing including a baffle between the lower guide bearing and the cooling coils, including the step of removing the baffle as part of the method of upgrading.

3. The method of claim 1 wherein the oil reservoir includes a flinger ring suspended below the guide bearing support and extending outwardly from the guide bearing support toward the rotor shaft, including the step of removing the flinger ring as part of the method of upgrading.

4. The method of claim 1 wherein the reservoir includes an original keeper supported by an outer wall of the reservoir and extending radially inward and connecting with a lower portion of the guide bearing to support the lower portion of the guide bearing, including the step of replacing the keeper with a thicker keeper.

5. The method of claim 4 wherein the thicker keeper has a general geometry that is substantially the same as the original keeper except for increased thickness.

6. The method of claim 5 wherein the thicker keeper is approximately 0.125 inch (0.32 cm) thick.

\* \* \* \* \*